US011206267B2

(12) United States Patent
Chauhan et al.

(10) Patent No.: US 11,206,267 B2
(45) Date of Patent: Dec. 21, 2021

(54) FINE GRAINED DIGITAL EXPERIENCE CONTROLS

(71) Applicant: T-Mobile USA, Inc., Bellevue, WA (US)

(72) Inventors: Kanakrai Chauhan, Snoqualmie, WA (US); Pandurang Kshirsagar, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 212 days.

(21) Appl. No.: 16/036,867

(22) Filed: Jul. 16, 2018

(65) Prior Publication Data

US 2019/0238549 A1 Aug. 1, 2019

Related U.S. Application Data

(60) Provisional application No. 62/624,659, filed on Jan. 31, 2018.

(51) Int. Cl.
*H04L 29/06* (2006.01)
*G06N 20/00* (2019.01)
*G06F 16/22* (2019.01)

(52) U.S. Cl.
CPC ......... *H04L 63/102* (2013.01); *G06N 20/00* (2019.01); *H04L 63/20* (2013.01); *G06F 16/22* (2019.01)

(58) Field of Classification Search
CPC ..... H04L 63/102; H04L 63/20; H04L 63/105; H04L 63/101; G06N 20/00; G06N 20/10; G06N 7/005; G06N 20/20; G06N 5/003; G06N 3/006; G06F 16/22; H04W 12/088
See application file for complete search history.

(56) References Cited

U.S. PATENT DOCUMENTS

| | | |
|---|---|---|
| 8,332,500 B1 | 12/2012 | Singleton et al. |
| 8,850,421 B2 | 9/2014 | Proud |
| 9,167,404 B1 | 10/2015 | Freed et al. |
| 9,264,426 B2 | 2/2016 | Buer et al. |
| 9,425,627 B2 | 8/2016 | Proud |
| 9,510,357 B1 | 11/2016 | Egner et al. |
| 9,723,367 B1 * | 8/2017 | Long .............. H04N 21/4751 |
| 9,940,807 B1 | 4/2018 | Brasch et al. |
| 10,063,564 B2 | 8/2018 | Seigel et al. |

(Continued)

OTHER PUBLICATIONS

U.S. Appl. No. 16/036,839 Non Final Office Action dated Aug. 22, 2019, 13 pages.

(Continued)

*Primary Examiner* — Henry Tsang
(74) *Attorney, Agent, or Firm* — Han Santos, PLLC (57) ABSTRACT

An example method of fine grained digital experience controls is performed by an application server. The application server receives telemetry data that indicates a usage of a user device. The telemetry data is stored to one or more databases and analyzed to determine one or more usage patterns that are clustered by an identity of a user of the user device. The application server then monitors content accessed by the user and determines whether a rule violation has occurred by applying one or more rules to the accessed content. In response to determining that the rule violation has occurred, the application server sends a content blocking trigger to the user device to trigger the user device to block the content.

20 Claims, 6 Drawing Sheets

(56) References Cited

U.S. PATENT DOCUMENTS

| | | | |
|---|---|---|---|
| 10,291,465 B2 | 5/2019 | Rjeili et al. | |
| 10,346,905 B1 | 7/2019 | Chang et al. | |
| 2006/0223495 A1 | 10/2006 | Cassett et al. | |
| 2006/0277564 A1* | 12/2006 | Jarman | H04N 21/84 725/25 |
| 2008/0065746 A1 | 3/2008 | Moghaddam et al. | |
| 2009/0253431 A1 | 10/2009 | Shi et al. | |
| 2010/0268645 A1 | 10/2010 | Martino et al. | |
| 2012/0117221 A1* | 5/2012 | Katpelly | H04N 21/4135 709/224 |
| 2012/0238287 A1 | 9/2012 | Scherzer | |
| 2012/0278867 A1 | 11/2012 | Cox et al. | |
| 2012/0310804 A1 | 12/2012 | Raleigh et al. | |
| 2013/0010962 A1 | 1/2013 | Buer et al. | |
| 2013/0040629 A1 | 2/2013 | Sprigg et al. | |
| 2013/0223308 A1 | 8/2013 | Chandra et al. | |
| 2013/0262233 A1 | 10/2013 | Bradley et al. | |
| 2013/0303110 A1 | 11/2013 | Gauthier | |
| 2013/0340034 A1 | 12/2013 | Rich et al. | |
| 2014/0006483 A1 | 1/2014 | Garmark et al. | |
| 2014/0006947 A1 | 1/2014 | Garmark et al. | |
| 2014/0007154 A1* | 1/2014 | Seibold | H04H 60/46 725/25 |
| 2014/0047512 A1 | 2/2014 | Sidi | |
| 2014/0189808 A1 | 7/2014 | Mahaffey et al. | |
| 2014/0215081 A1 | 7/2014 | Cili et al. | |
| 2014/0289824 A1 | 9/2014 | Chan et al. | |
| 2014/0344927 A1* | 11/2014 | Turgeman | G06F 21/32 726/22 |
| 2015/0082396 A1 | 3/2015 | Theebaprakasam et al. | |
| 2015/0089599 A1* | 3/2015 | Vignisson | G06F 21/552 726/4 |
| 2015/0092673 A1 | 4/2015 | Singh et al. | |
| 2015/0131488 A1 | 5/2015 | Martinez et al. | |
| 2015/0199660 A1 | 7/2015 | Dolan et al. | |
| 2015/0326550 A1 | 11/2015 | Schropfer et al. | |
| 2016/0103996 A1* | 4/2016 | Salajegheh | G06F 11/3024 726/25 |
| 2016/0191588 A1 | 6/2016 | Shafer | |
| 2016/0248766 A1* | 8/2016 | Tembey | H04L 63/0861 |
| 2016/0267524 A1 | 9/2016 | Ng | |
| 2016/0294920 A1 | 10/2016 | Besprosvan | |
| 2016/0301779 A1* | 10/2016 | Cui | H04L 45/566 |
| 2016/0342992 A1 | 11/2016 | Lee | |
| 2016/0373548 A1 | 12/2016 | Fails | |
| 2017/0180394 A1 | 6/2017 | Crofton et al. | |
| 2017/0264628 A1 | 9/2017 | Treat et al. | |
| 2017/0353463 A1* | 12/2017 | Wu | G06F 21/74 |
| 2018/0063670 A1 | 3/2018 | Garg et al. | |
| 2018/0098216 A1 | 4/2018 | Vincent et al. | |
| 2018/0288060 A1 | 10/2018 | Jackson et al. | |
| 2018/0352301 A1* | 12/2018 | Tofighbakhsh | H04N 21/2668 |
| 2018/0373887 A1 | 12/2018 | Smith | |
| 2019/0124056 A1 | 4/2019 | Monibi et al. | |
| 2019/0180635 A1 | 6/2019 | Jennings et al. | |
| 2020/0020220 A1 | 1/2020 | Stefanski et al. | |

OTHER PUBLICATIONS

U.S. Appl. No. 16/036,839, Notice of Allowance dated Oct. 29, 2019, 17 pages.

U.S. Appl. No. 16/036,862, Non Final Office Action dated Dec. 26, 2019, 42 pages.

U.S. Appl. No. 16/036,855, Non-Final Office Action dated Aug. 20, 2020, 37 pages.

U.S. Appl. No. 16/036,862, Final Office Action dated Jun. 25, 2020, 64 pages.

U.S. Appl. No. 16/036,862, Office Action dated Jan. 7, 2021, 70 pages.

U.S. Appl. No. 16/036,875, Office Action dated Mar. 12, 2021, 58 pages.

U.S. Appl. No. 16/036,855, Final Office Action dated May 3, 2021, 42 pages.

GlobeNewsWire, "WebSafety, Inc., iOS and Android App Now Available for Free to Help More Parents Protect Their Children Online", Jun. 16, 2015, GlobeNewsWire (Year: 2015).

U.S. Appl. No. 16/036,862, Notice of Allowance dated Jul. 8, 2021, 89 pages.

U.S. Appl. No. 16/036,862, Notice of Allowance dated Sep. 9, 2021, 86 pages.

U.S. Appl. No. 16/036,875, Final Office Action dated Jul. 21, 2021, 41 pages.

U.S. Appl. No. 16/036,855, Office Action dated Sep. 15, 2021, 46 pages.

* cited by examiner

FINE GRAINED DIGITAL EXPERIENCE CONTROLS

CROSS-REFERENCE TO RELATED APPLICATION

This application claims the benefit of U.S. Provisional Application No. 62/624,659, entitled "FINE GRAINED MOBILE EXPERIENCE CONTROLS," filed Jan. 31, 2018 and expressly incorporated herein by reference in its entirety.

BACKGROUND

Wireless communication networks are widely deployed to provide various types of communication content such as, voice, data, text, and so on. Typical wireless communication networks may be multiple-access systems capable of supporting communication with multiple users by sharing available system resources (e.g., bandwidth, transmission power, etc.). Earlier examples of such multiple-access systems may include code division multiple access (CDMA) systems, time division multiple access (TDMA) systems, frequency division multiple access (FDMA) systems, and more recent examples include orthogonal frequency division multiple access (OFDMA) systems, and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple wireless devices. Each wireless device may communicate with one or more base stations via transmissions on forward and reverse links. The forward link (or downlink) refers to the communication link from base stations to wireless devices, and the reverse link (or uplink) refers to the communication link from wireless devices to base stations.

The wireless communication network is controlled and operated by a mobile network operator (MNO). In some scenarios, access to the wireless communication network is granted to all users associated with an active account with the MNO. For example, users comprising the family or group for an account may be granted access to the wireless communication network.

In some situations, a parent may wish to impose various controls and/or restrictions on a child's use of the mobile device. In particular, parents may want to restrict the access of content to their children. However, conventional parental control features lack fidelity on content locks, particularly for internet browsing. For example, time locks may be set on a per browser or per application basis. That is, a parent may set a time period for which the web browser is inaccessible. However, such rough parental controls result in children often being locked out from accessing permissible content, such as using a web browser for school work. Furthermore, the lack of fidelity in the conventional parental control features may result in a parent having to frequently override the parental controls to enable access to features/content that were not intended to be blocked.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., user equipment, server, etc.), computer-readable media, and processes for fine grained digital experience controls.

As mentioned above, some parents may desire restrict a child's access to certain content. However, conventional parental control features may lack the required fidelity which results in the overabundance of content being blocked. Accordingly, aspects of the present disclosure include a server-side parental control module and a pattern recognition module to enable parents and/or other supervisors to not only enable blocking on a per browser or per application basis, but also on a per screen and per content basis.

A user device, also referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
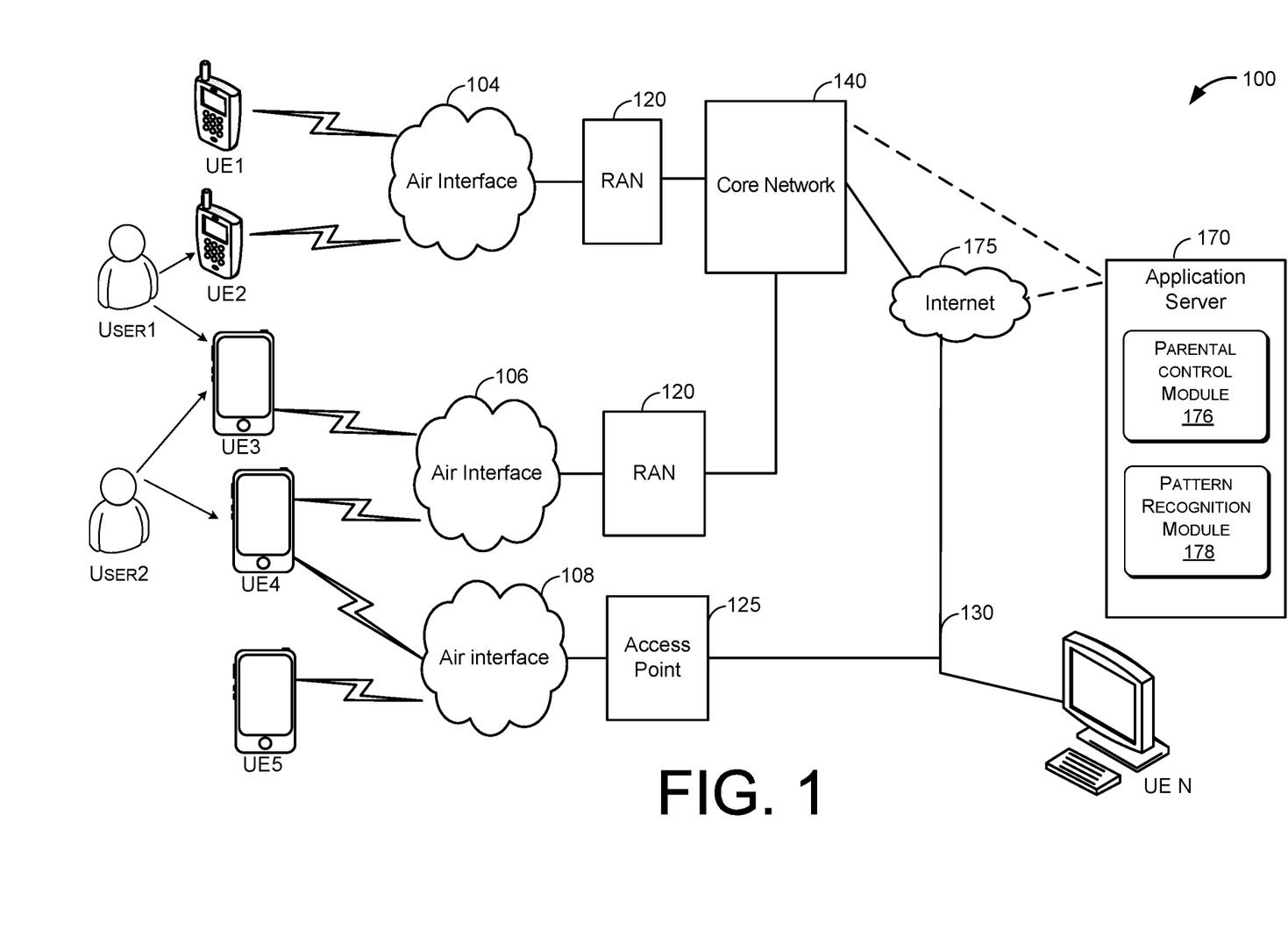
FIG. 1 illustrates an example architecture of a wireless communication network.

FIG. 1 illustrates a high-level system architecture of a wireless communication network 100 in accordance with various aspects. The wireless communication network 100 contains UEs 1 ... N. The UEs 1 ... N can include mobile phones, personal computers (e.g., a laptop computer, desktop computer, etc.), television receivers (e.g., a television, streaming device, digital video recorder, etc.), voice-activated virtual assistants (e.g., GOOGLE HOME, AMAZON ECHO, etc.), gaming consoles (e.g., MICROSOFT XBOX, SONY PLAYSTATION, NINTENDO SWITCH, 3DS, etc.), network devices (e.g., hub, switch, bridge, router, gateway, network interface card, wireless access point, modem, etc.)

and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or laptop.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection 130. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . 5 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a direct wired connection 130 to the Internet 175, such as a direct connection to a modem or router, which can correspond to the access point 125 itself in an example (e.g., for a WiFi router with both wired and wireless connectivity).

The core network 140 is configured to support one or more communication services (e.g., Voice-over-Internet Protocol (VoIP) sessions, Push-to-Talk (PTT) sessions, group communication sessions, social networking services, etc.) for UEs that can connect to the core network 140 via the RANs 120 and/or via the Internet 175, and/or to provide content (e.g., web page downloads) to the UEs.

Referring to FIG. 1, an application server 170 is shown as connected to the Internet 175, the core network 140, or both. The application server 170 can be implemented as a plurality of structurally separate servers, or alternately may correspond to a single server.

As shown in FIG. 1, the application server 170 may include a parental control module 176 and a pattern recognition module 178. The parental control module 176 may maintain a set of rules for generating a trigger to block (i.e., prevent access to) certain content at a UE. The parental control module 176 may further provide an interface (e.g., website) to allow a parent to browse available rules, apply certain rules to users, and/or to modify or author new rules.

The pattern recognition module 178 may implement one or more machine learning techniques to identify usage and/or content patterns. The identified patterns may then be used to inform the parental control module 176 of whether a particular browser, screen, application, and/or content should be blocked.

As mentioned above, the wireless communication network 100 may provide for multi-user to multi-device capabilities. That is, the same user may utilize multiple different devices to access the wireless communication network 100 and multiple different users may utilize the same device to access the wireless communication network 100. For example, as shown in FIG. 1, User1 may utilize UE2 as well as UE3 to access wireless communication network 100. Similarly, User2 may utilize the same UE3 as well as a different UE (i.e., UE4) to access the wireless communication network 100.

Figure 2:
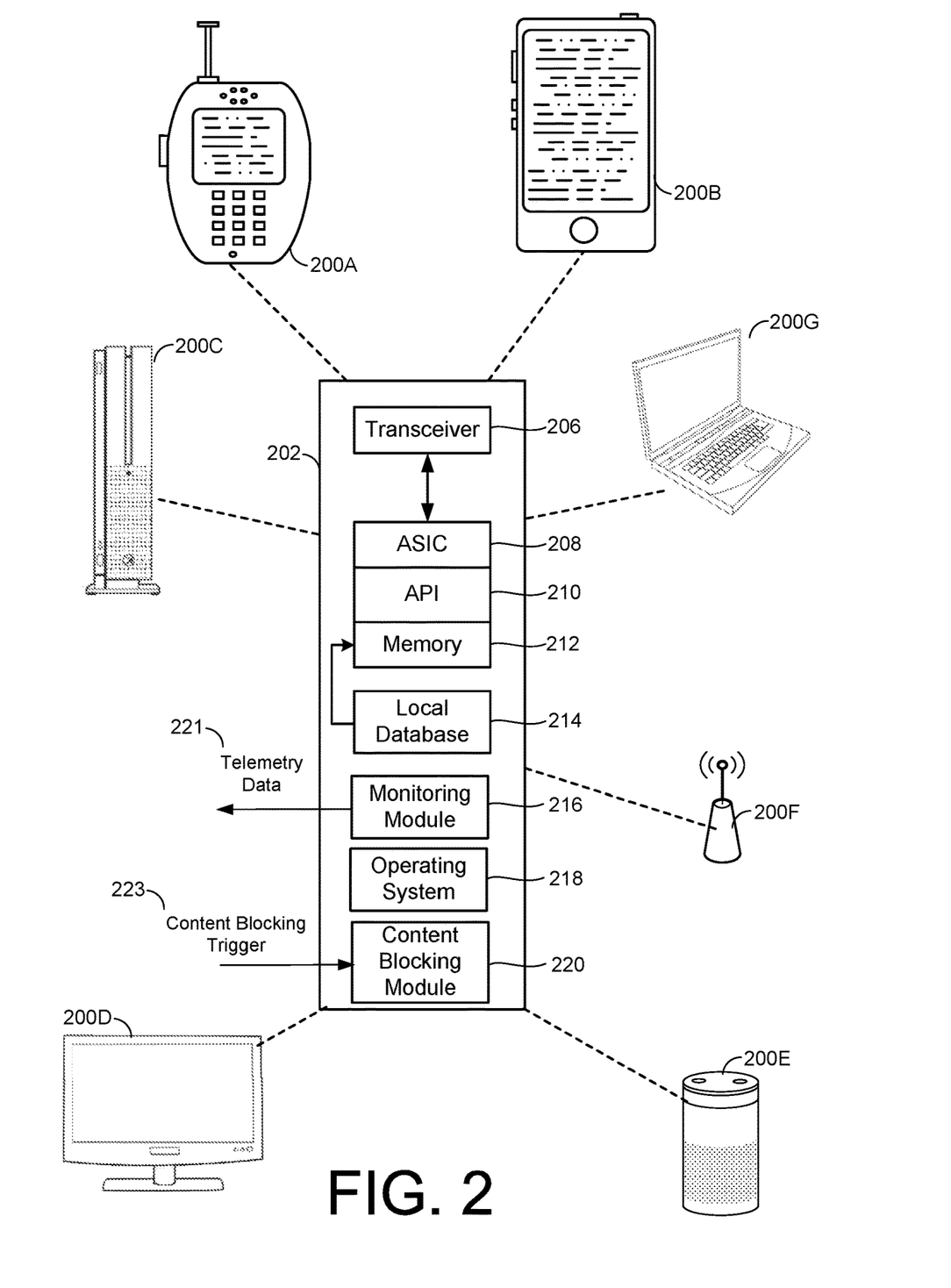
FIG. 2 illustrates examples of user equipments (UEs).

FIG. 2 illustrates examples of UEs (i.e., user devices) of various device types in accordance with embodiments of the invention. UEs 200A-G are possible implementations of any of the UEs 1-N of FIG. 1. The various device types illustrated in FIG. 2 include a mobile phone (e.g., UE 200A and UE 200B), a gaming console (e.g., UE 200C), a television receiver (e.g., UE 200D), a voice-activated virtual assistant device (e.g., UE 200E), a network device (e.g., UE 200F), and a personal computer (e.g., UE 200G).

A mobile phone device type, such as UEs 200A and 200B, may also be referred to as a cellular phone and includes portable telephones that can make and receive calls over a radio frequency link while the user is moving within a telephone service area.

A game console device type, such as UE 200C may include an electronic, digital, or computer device that outputs a video signal or visual images to display a video game that one or more users can play. In some aspects, a game console device type may use proprietary formats unlike other consumer electronics (e.g., music players, movie players, etc.) which utilize industry-wide standard formats.

A television receiver device type, such as UE 200D, may include a television set, a television tuner, a smart tv, a digital video recorder, and/or a video streaming device. In some aspects, a television receiver device type may include a display as well as speakers for the purpose of viewing video content.

A voice-activated virtual assistant device type, such as UE 200E, may be configured to perform tasks or services for a user based on voice commands.

A network device type, such as UE 200F, may include networking hardware and/or software, which are configured to facilitate communication and interaction between devices on a computer network. Network device types may include gateways, routers, network bridges, modems, wireless access points, networking cables, line drivers, switches, hubs, and repeaters; and may also include hybrid network devices such as multilayer switches, protocol converters, bridge routers, proxy servers, firewalls, network address translators, multiplexers, network interface controllers, wireless network interface controllers, ISDN terminal adapters and other related hardware.

A personal computer (PC) device type, such as UE 200G, may include a multi-purpose computer whose size, capabilities, and price make it feasible for individual use. In some aspects, PCs are intended to be operated directly by an end user, rather than by a computer expert or technician.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A-G, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the platform 202 is illustrated as including a monitoring module 216. In one aspect, monitoring module 216 is a client-side application that interacts with an operating system 218 of the platform 202 to intercept client-side application and device use. The device/application use may then be incorporated into telemetry data 221 that is then provided to the application server 170 for analysis. In some aspects, the telemetry data may include information regarding which applications are being used, a location of the UE (e.g., GPS location coordinates and/or WiFi location), internet use, chat, voice, text, and so on.

As shown in FIG. 2, the platform 202 may further include a content blocking module 220. The content blocking module 220 may be configured to receive a content blocking trigger 223 from the application server 170. In response to receiving the content blocking trigger 223, the content blocking module 220 may interface with the operating system 218 to block certain content from being accessed on the UE (e.g., UE 200A-G). In one example, blocking certain content from being accessed may include preventing the rendering and/or the display of the blocked content. In one example, the blocked content may include a particular video, image, audio, and/or text accessed by way of a web browser or other application residing on the UE.

Thus, in some aspects, the ASIC 208, memory 212, API 210, local database 214, monitoring module 216, and content blocking module 220 may all be used cooperatively to load, store and execute the various functions disclosed herein and thus the logic to perform these functions may be distributed over various elements. Alternatively, the functionality could be incorporated into one discrete component. Therefore, the features of the UEs 200A-G in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. Voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
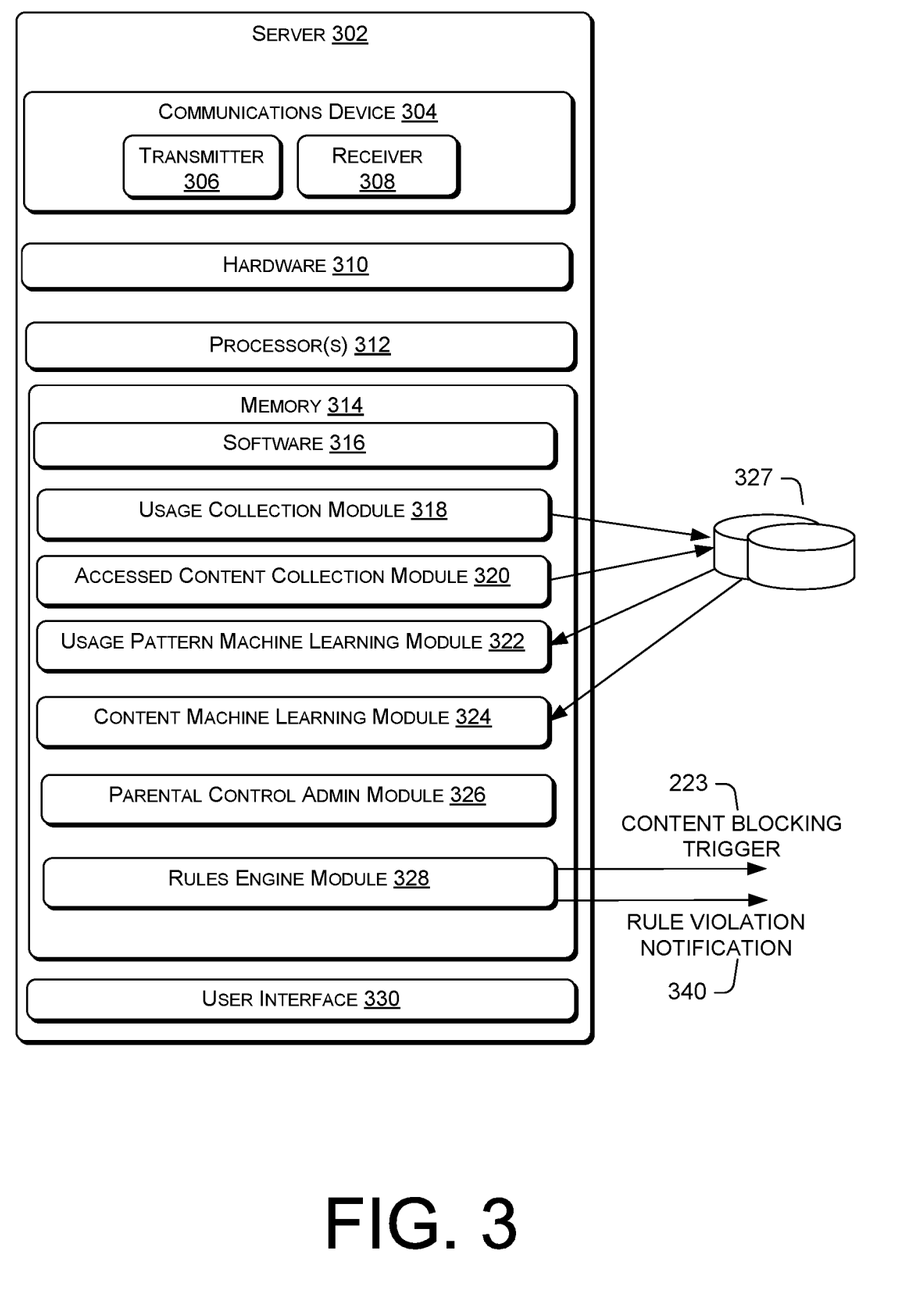
FIG. 3 illustrates an example server.

FIG. 3 illustrates an example server 302. Server 302 is one possible implementation of application server 170 of FIG. 1. The components illustrated in FIG. 3 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The server 302 may include at least one communication device (represented by the communication device 304) for communicating with other nodes. For example, the communication device 304 may comprise a network interface that is configured to communicate with one or more network entities via a wire-based or wireless links. In some aspects, the communication device 304 may be implemented as a transceiver configured to support wire-based or wireless signal communication. This communication may involve, for example, sending and receiving: messages, parameters, or other types of information. Accordingly, in the example of FIG. 3, the communication device 304 is shown as comprising a transmitter 306 and a receiver 308.

The server 302 may also include other components that may be used in conjunction with the operations as taught herein. For example, the server 302 may include hardware 310, one or more processors 312, memory 314, and a user interface 330.

The hardware 310 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the server 302 may include a user interface 330 for providing indications (e.g., audible and/or visual indications) to a user and/or for receiving user input (e.g., upon user actuation of a sensing device such a keypad, a touch screen, a microphone, and so on).

The memory 314 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 312 of server 302 may execute instructions and perform tasks under the direction of software components that are stored in memory 314. For example, the memory 314 may store various software components that are executable or accessible by the one or more processors 312 of the server 302. The various components may include software 316, a usage collection module 318, an accessed content collection module 320, a usage pattern machine learning module 322, a content machine learning module 324, a parental control admin module 326, and a rules engine module 328. The software 316, usage collection module 318, accessed content collection module 320, usage pattern machine learning module 322, and content machine learning module 324, collectively, may be one possible implementation of the pattern recognition module 178 of FIG. 1. Similarly, the parental control admin module 326 and rules engine module 328, collectively, may be one possible implementation of the parental control module 176 of FIG. 1.

The software 316, usage collection module 318, accessed content collection module 320, usage pattern machine learning module 322, content machine learning module 324, parental control admin module 326, and rules engine module 328 may include routines, program instructions, objects, and/or data structures that perform particular tasks or implement particular abstract data types. For example, the usage collection module 318 may include one or more instructions, which when executed by the one or more processors 312 direct the server 302 to perform operations related to the collection of telemetry data. That is, the usage collection module 318 may be configured to receive telemetry data (e.g., telemetry data 221 of FIG. 2) from one or more UEs and store the telemetry data into one or more databases 327. In some aspects, the usage collection module 318 may be configured to receive (and store in one or more databases 327) telemetry data from one or more other servers included in core network 140 related to the usage of the wireless communication network 100 by a UE and/or by particular user. In one example, the one or more databases 327 are included in memory 314 of server 302.

The accessed content collection module 320 may include one or more instructions, which when executed by the one or more processors 312 direct the server 302 to perform operations related to the collecting and monitoring content accessed by a user, such as content included in a web page, or provided by way of an application executed on the UE. In some examples, the accessed content collection module 320 may receive content summaries, such as histograms and/or metadata tags of content accessed by a user. In some examples, the content summaries are generated by, and received from, the UE itself. In other examples, the content summaries may be generated by one or more other servers included in core network 140 related to content accessed by the UE via the wireless communication network 100.

The usage pattern machine learning module 322 may include one or more instructions, which when executed by the one or more processors 312 direct the server 302 to perform operations related to the analysis of telemetry data stored in the one or more databases 327 to determine one or more usage patterns classified by user type, such as by age. For example, a usage pattern may be classified as usage associated with an adult, an older teen, a young teen, and/or young child. In other words, the usage pattern machine learning module 322 may determine the user type of a particular user (e.g., age range) by applying one or more machine learning techniques to the telemetry data in the databases 327. In one aspect, the identified patterns may then be provided to a rules engine module 328 (discussed below) to be used in the determination of whether a particular screen and/or content should be locked.

The content machine learning module 324 may include one or more instructions, which when executed by the one or more processors 312 direct the server 302 to perform operations related to reviewing patterns of content to determine whether the accessed content is appropriate for the identified user type (e.g., age range). The identified patterns may then be provided to the rules engine module 328 to be used in the determination of whether a particular screen and/or content should be locked. In one example, the content machine learning module 324 may determine whether the accessed content is appropriate for a particular user type by applying one or more machine learning techniques to the accessed content to determine a content type of the accessed content. For example, the content machine learning module may cluster content patterns by a content type that corresponds to an appropriate age rage for the content (e.g., 0-7, 8-12, 13-18, and over 18.) Other content types may correspond to MPAA content settings of G, PG, PG-13, R, and XXX.

In some aspects, content may include any media data that is displayed, played, or otherwise rendered for viewing, listening either alone or in combination to a user or other person. Typically, media includes text, still image, audio and video. Where different media are concurrently displayed, the media in combination is referred to as multimedia. Content patterns may include optical character recognition, audio to text algorithms, sound recognition, and object recognition. Where media streaming quality would be compromised by content recognition algorithms, heuristics like color histograms and metadata may be applied as part of content pattern recognition.

As mentioned above, the content accessed by a UE may include a particular video, image, audio, and/or text accessed by way of a web browser or other application residing on the UE. Thus, the content machine learning module 324 may optionally include one or more of object recognition and/or optical character recognition to aid in the analysis/identification of the content.

In some examples, the usage pattern machine learning module 322 and/or the content machine learning module 324 may implement a machine learning technique that is a supervised, unsupervised, or a reinforcement learning technique. Examples of supervised learning techniques include K-nearest neighbor (KNN), Naive Bayes, logistic regression, support vector machine (SVM), and others. Other supervised learning analysis techniques include linear or polynomial regression analysis, decision tress analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the usage pattern machine learning module 322 and/or the content machine learning module 324 to generate clustered patterns. These are not intended to be limiting.

Still referring to FIG. 3, the parental control admin module 326 may include one or more instructions, which when executed by the one or more processors 312 direct the server 302 to perform operations related to providing an interface (e.g., via a secure website) to enable a user or administrator, such as a primary account holder (PAH), to browse one or more parental control rules, select a rule to be applied to a user or user type, and optionally to modify and/or author new rules. In some embodiments, the monitoring module 216 may determine that the user of the respective UE is of the age of majority (e.g. 18 in most states), in which case the monitoring module 216 (e.g., see platform 202 of FIG. 2) may expose a user setting on the UE to enable the user to opt out of parental settings. Otherwise, the UE will either not expose an opt out user setting or may disable the setting.

The rules engine module 328 may include one or more instructions, which when executed by the one or more processors 312 direct the server 302 to perform operations related to maintaining and/or applying one or more rules for blocking certain content. For example, the rules maintained by the rules engine module 328 may include a rule that restricts access to content, such as text that includes profanity, from being accessed by a certain user type (e.g., young children). Thus, if the patterns provided by the usage pattern machine learning module 322 identify a user as a young child, and the pattern provided by the content machine learning module 324 identifies the accessed content as containing profanity, then the rules engine module 328 may determine that a rule violation has occurred and generate a content blocking trigger 223. As mentioned above, the content blocking trigger 223 may be provided to the client-side content blocking module 220 (e.g., see FIG. 2). In one aspect, the content blocking trigger 223 identifies the accessed content as well as instructions to block the accessed content. Thus, in response to receiving the content blocking trigger 223, the content blocking module 220 may prevent the rendering and/or display of the accessed content.

In some examples, a user may utilize multiple devices, some of which may include different device types. Accordingly, in some implementations, the rules engine module 328 may be configured to send the content blocking trigger 223 to not only the UE currently being used by the user, but also to other UEs associated with this particular user. By way of example, one rule included in the rules engine module 328 may define a total amount of screen time across all device types utilized by a user. Thus, if the user exceeds the total amount of screen time, then the content blocking trigger 223 may be sent to multiple UEs to prevent that user from using any of those devices. As mentioned above, a user may utilize multiple device types, thus a rule violation that occurs on one device type (e.g., mobile phone) may trigger the server 302 to send the content blocking trigger 223 to other device types as well (e.g., to a gaming console).

In one example, the rules maintained by the rules engine module 328 may include an associated label and/or name to assist the PAH to apply a particular rule to a user and/or user type.

Figure 4:
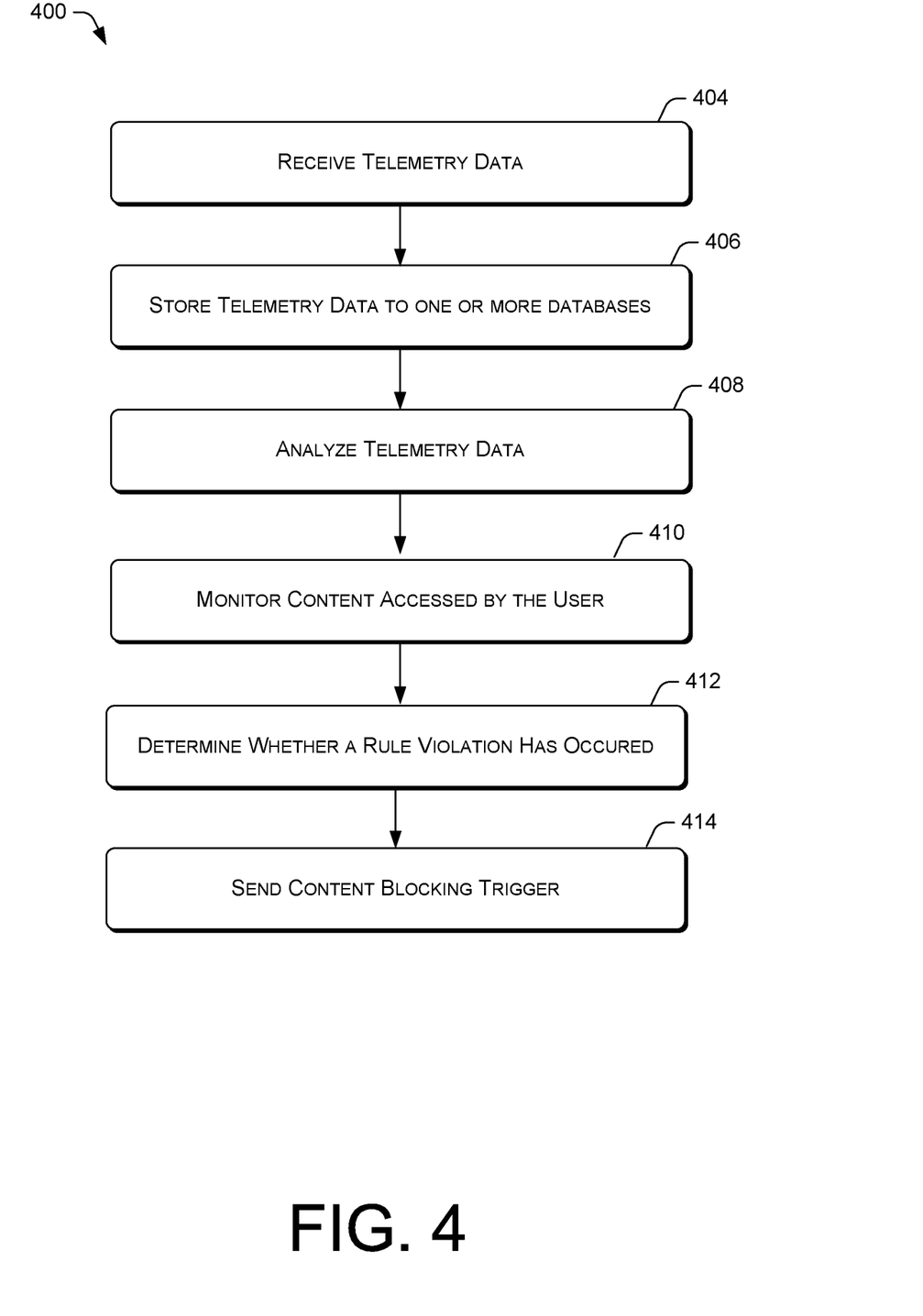
FIG. 4 is a flow diagram of an example process for fine grained digital experience controls.

FIG. 4 is a flow diagram of an example process 400 for user behavior determination. Process 400 is one possible process performed by application server 170 of FIG. 1 and/or server 302 of FIG. 3. Process 400 will be described with reference to FIGS. 2-4.

In a process block 404, the usage collection module 318 receives telemetry data. As mentioned above, the usage collection module 318 may receive the telemetry data from one or more UEs by way of the monitoring module 216 (e.g., see FIG. 2). In one example, the received data relates to activities and/or device usage data collected locally at the UE. In one aspect, the monitoring module 216 may periodically upload telemetry data to the server 302 according to a predetermined schedule. In another example, the server 302 may send a request to the monitoring module 216 for the latest telemetry data. The usage collection module 318 may then store the collected data to the one or more databases 327 (i.e., process block 406).

In a process block 408, the usage pattern machine learning module 322 may then analyze the telemetry data stored in the one or more databases 327 to determine one or more usage patterns clustered by an identity and/or user type of a user of the UE. For example, usage pattern machine learning module 322 may apply one or more machine learning techniques to the data stored in the databases 327 to associate one or more users with a particular usage of a UE. The telemetry data stored in the one or more databases may include an indication of services utilized by a particular account (e.g., text messaging, phone calling, etc.). The telemetry data may further include, for example, which applications have been launched, and the like. In addition, the telemetry data may include associated timing information, such as the duration of a usage (e.g., how long was the web browser open) and/or a respective time that the usage occurred (e.g., web browsing occurred immediately after text message was sent). In one example, the usage pattern machine learning module 322 may maintain a plurality of clusters and an associated user and/or user type of each.

In some aspects, clustering by user means clustering data where the atomic units are specific persons as opposed to non-person users such as machines, sets of users, etc. Typically, a user may be identified by a phone number or MSISDN, but alternatively may be associated with an account identifier. In some cases, where user equipment are shared, other identifiers rather than a user equipment identifier or account identifier may be used to uniquely identify a user. For example, a user identifier used to log on to the user equipment, or alternatively a virtual phone running on the user equipment, may be used. Alternatively, a session identifier may be used.

Where data is clustered by user or user type, the atomic units are measured for similarity to each other via a machine learning technique in usage pattern machine learning module 322. Where two atomic units, such as two accounts, are similar, the usage pattern machine learning module 322 may infer that the data associated with the first account may be similar to the data associated with the second account to a measurable degree of confidence.

Alternatively, data may be clustered by user type. A user type defines the levels of graduation of content appropriateness. For example, user types graduate by age, e.g. 0-7, 8-12, 13-18, and over 18. Other user types may graduate by content. For example, MPAA content settings of G, PG, PG-13, R, and XXX. Because standards for user types may differ from family to family and group to group, there may also be user defined (e.g., parent defined) user types. Where data is clustered by user type, the machine learning algorithm will first determine similarities between user types or alternatively subsets of user types.

Next, in a process block 410, the content machine learning module 324 monitors accessed content to determine content patterns. As mentioned above, the content machine learning module 324 may utilize one or more machine learning techniques to determine whether the accessed content is appropriate for a particular user type.

In a process block 412, the rules engine module 328 determines whether a rule violation has occurred by applying one or more rules to the access content and/or content patterns. If a rule violation has occurred, the rules engine module 328 may then send (e.g., process block 414) the content blocking trigger 223 to the UE to trigger the UE to block the content. As mentioned above, in some instances, the rules engine module 328 may be configured to send the content blocking trigger 223 to other UEs associated with the user, including UEs of different device types.

Furthermore, the rules engine module 328 may be further configured to generate a rule violation notification 340. The server 302 may then send the rule violation notification 340 to an administrator (e.g., parent) to alert them of the rule violation. In some examples, the rule violation notification 340 may be sent to the administrator as a text message sent via wireless communication network 100 of FIG. 1.

Figure 5:
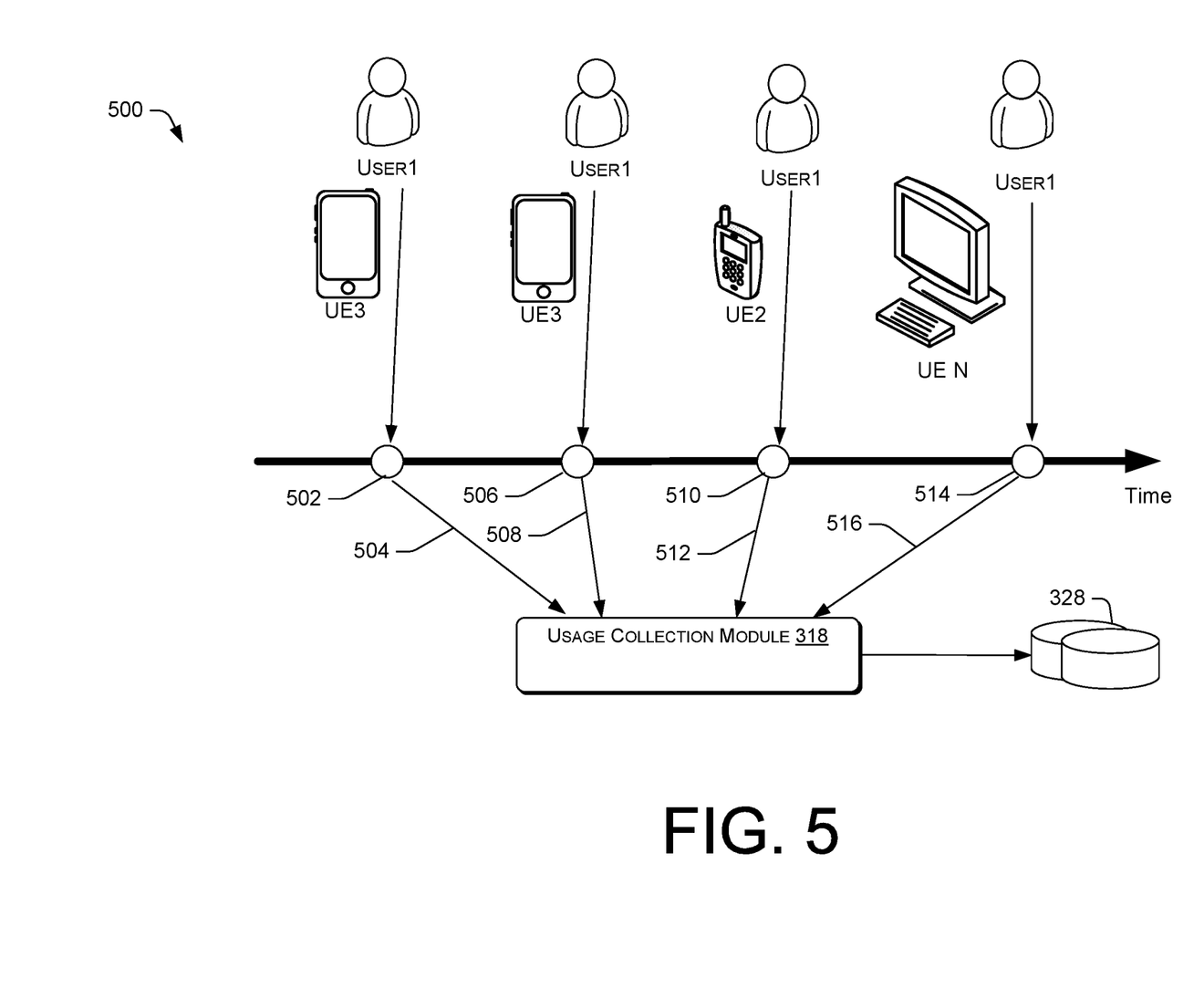
FIG. 5 is a diagram illustrating the collection of usage telemetry data.

FIG. 5 is a diagram illustrating the collection of usage telemetry data. Specifically, it illustrates how a User1 progresses over time and develops a historical (time-ordered series) of equipment usage and behavior. In example, the illustrated usage events 502, 506, 510, and 514, collectively, represent a time-ordered series of events.

For example, User1 may interact with UE3 to generate a usage event 502. Usage event 502 could possibly be User1 using UE3 to access a web site at a particular URL. User1 may also make some purchases during the usage event 502. Data collected during usage event 502 and subsequent usage events may be sent from the monitoring module 216 to usage and behavior collection module 318 as telemetry data 504. The usage collection module 318 then stores records of usage event 502 to the one or more databases 327.

As User1 progresses over time, telemetry data (e.g., 508, 512, and 516) of subsequent usage events (e.g., 506, 510, and 514) are also collected by the usage collection module 318. For example, as shown via usage event 506, User1 may later interact with a different information system (e.g., different website) using the same UE3. For example, usage event 506 may be User1 using UE3 to update the user's social network records at another URL. Usage collection module 318 may receive the telemetry data 508 associated with usage event 506 and store the telemetry data 508 to the one or more databases 327.

Accordingly, the telemetry data collected with respect to a particular user need not be specific to a particular site or to a particular type of interaction. Any definable and observable user event whose parameters may be captured is a candidate for storing as one or more telemetry data for a user.

Furthermore, telemetry data for a user need not be specific to a particular client device. As shown via usage event 510, which may be after a number of other usage events, User1 may use a different client device, here client UE2 to interact with an information system. Usage event 510 could potentially be User1 further updating the user's social network records, perhaps to upload a picture just taken with UE2. Again, usage collection module 318 may receive the telemetry data 512 and store the telemetry data 512 to the one or more databases 327.

Figure 6:
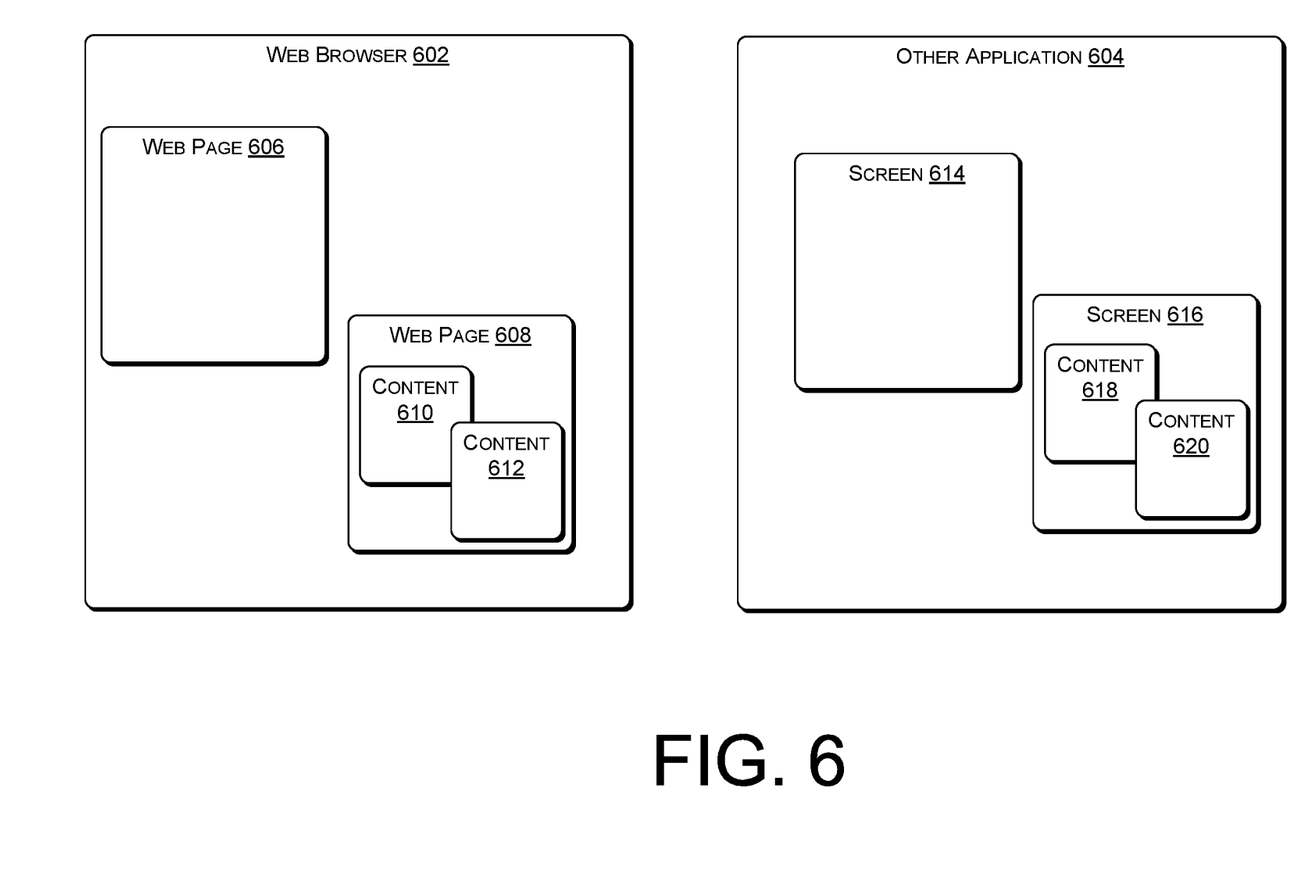
FIG. 6 is a diagram illustrating an example web browser and an application.

FIG. 6 is a diagram illustrating an example web browser 602 and other application 604. Web browser 602 and other application 604 are possible implementations of applications that may reside and be executed at a UE (e.g., UE 200B of FIG. 2). For example, the illustrated web browser 602 of FIG. 6 may be presented as a user interface on the display of UE 200B. As shown, the web browser 602 may display one or more web pages 606 and 608. Web page 608 is shown as including the display of various content, such as content 610 and content 612. As mentioned above, content 610 and/or content 612 may correspond to a particular image, text, sound, and/or video or some combination of the foregoing. Aspects of the present disclosure may include parental controls that enable the locking of a UE on a per browser basis, per web page basis, and/or on per content basis. For example, in response to receiving the content blocking trigger 223 the UE 200B may block (prevent execution of) the entire web browser 602. In another example, the UE 200B may block just web page 606. Thus, web browser 602 may be prevented from displaying web page 606, but still be allowed to render and display web page 608. In yet another example, the UE 200B may block just specific content, such as content 610. Thus, the web page 608 may be allowed to render and display content 612, while preventing the rendering and display of content 610, even though both content 610 and 612 are resources for the same web page 608.

The illustrated other application 604 of FIG. 6 may include an application locally installed on a UE (e.g., UE 200B of FIG. 2), where the other application 604 is configured to present one or more screens 614 and 616 as a user interface on the display of UE 200B. By way of example, other application 604 may be a social networking application for providing the user access to a user's social networking account.

As shown, the other application 604 may display one or more screens 614 and 616. Screen 616 is shown as including the display of various content, such content 618 and content 620. As mentioned above, content (i.e., content 618 and content 620) may correspond to a particular image, text, sound, and/or video or some combination of the foregoing. Aspects of the present disclosure may include parental controls that enable the blocking of a UE on a per application basis, per screen basis, and/or on per content basis. For example, in response to receiving the content blocking trigger 223 the UE 200B may block (prevent execution of) the entire application 604. In another example, the UE 200B may lock just screen 614. Thus, other application 604 may be prevented from displaying screen 614, but still be allowed to render and display screen 616. In yet another example, the UE 200B may block just specific content, such as content 618. Thus, the screen 616 may be allowed to render and display content 620, while preventing the rendering and display of content 618, even though both content 618 and 620 are resources for the same screen 616.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of content blocking performed by an application server, the method comprising:
receiving, at the application server, first telemetry data, wherein the first telemetry data indicates at least a first usage of a first user device;
storing the first telemetry data to one or more databases;
analyzing, at the application server, telemetry data, including the first telemetry data, stored in the one or more databases to determine one or more usage patterns associated with the first usage;

monitoring, by the application server, streaming content accessed by the particular user, wherein the content includes a concurrent presentation of at least a first media and a second media on the first user device;

determining whether a media streaming quality of the streaming content is likely to be compromised by executing a content recognition algorithm;

in response to determining that the media streaming quality is likely to be compromised by the content recognition algorithm, determining, via at least a color histogram analysis and by the application server, one or more content patterns associated with the streaming content accessed by the particular user;

determining, by the application server, that a presentation of the first media violates one or more rules associated with the first user device, based at least in part on the content patterns;

generating a content block trigger to block a presentation of the first media and simultaneously permit access to the second media on the first user device; and sending, by the application server, the content blocking trigger to the first user device.

2. The method of claim 1, further comprising:

sending, by the application server, the content blocking trigger to a second user device associated with the particular user to trigger the second user device to block the streaming content.

3. The method of claim 2, wherein the first user device is a first device type, and wherein the second user device is a second device type.

4. The method of claim 3, wherein the first device type is a device type selected from the group consisting of a mobile phone, a personal computer, a television receiver, a voice-activated virtual assistant device, a gaming console, and a network device, and wherein the second device type is a different device type selected from the group.

5. The method of claim 1, wherein receiving the first telemetry data comprises communicating with a monitoring module of the first user device, wherein the monitoring module of the first user device is configured to intercept client-side application or device use and to incorporate the application or device use into the first telemetry data.

6. The method of claim 1, wherein monitoring the streaming content accessed by the particular user comprises analyzing the streaming content to determine the one or more content patterns.

7. The method of claim 6, wherein analyzing the content comprises applying, by a machine learning service module of the application server, one or more machine learning techniques to the streaming content to determine a content type of the one or more content patterns.

8. The method of claim 1, further comprising:

receiving input, at the application server, from an administrator, wherein the input defines the one or more rules; and sending, by the application server, a rule violation notification to the administrator in response to determining the rule violation.

9. The method of claim 1, further comprising:

determining that the particular user has exceeded an allotted time to access content via the first user device, and wherein, the content block trigger is configured to block a screen of the first user device, based at least in part on the particular user having exceeded the allotted time.

10. The method of claim 1, wherein the first media corresponds to a first media type and the second media corresponds to a second media type, the first media type and the second media type corresponding to one of a text, a still image, an audio, or a video.

11. The method of claim 10, wherein the first media type is different from the second media type.

12. The method of claim 10, wherein the first media type corresponds to the second media type.

13. An application server, comprising:

at least one processor; and at least one memory coupled to the at least one processor, the at least one memory having instructions stored therein, which when executed by the at least one processor, direct the application server to:

receive first telemetry data, wherein the first telemetry data indicates at least a first usage of a first user device;

store the first telemetry data to one or more databases;

analyze telemetry data, including the first telemetry data, stored in the one or more databases to determine one or more usage patterns associated with the first usage;

monitor streaming content accessed at the first user device, wherein the instructions to monitor the streaming content comprises instructions to analyze the content to determine one or more content patterns, wherein the content includes a concurrent presentation of at least a first media and a second media on the first user device;

determine whether a media streaming quality of the streaming content is likely to be compromised by executing a content recognition algorithm;

in response to determining that the media streaming quality is likely to be compromised by the content recognition algorithm, determining via, at least a color histogram analysis, the one or more content patterns associated with the streaming content;

determine that a presentation of the first media violates one or more rules, based at least in part on the one or more content patterns;

generate a content block trigger to block a presentation of the first media and simultaneously permit access to the second media on the first user device; and send the content blocking trigger to a plurality of user devices associated with the first user device.

14. The application server of claim 13, wherein the instructions further direct the application server to:

send the content blocking trigger to a second user device associated with a particular user of the first user device to trigger the second user device to block the streaming content.

15. The application server of claim 14, wherein the first device type is a device type selected from the group consisting of a mobile phone, a personal computer, a television receiver, a voice-activated virtual assistant device, a gaming console, and a network device, and wherein the second device type is a different device type selected from the group.

16. The application server of claim 13, wherein the instructions further detect the application server to:

in response to the determining that the media streaming quality is unlikely compromised by the content recognition algorithm, analyze the streaming content by a machine learning service module of the application server to determine a content type of the one or more content patterns.

17. The application server of claim 16, wherein the content type is one of a plurality of content types that identifies a corresponding appropriate age range for the content.

18. One or more non-transitory computer-readable media storing computer-executable instructions, which when executed by the at least one processor of an application server, direct the application server to:
receive first telemetry data, wherein the first telemetry data indicates at least a first usage of a first user device;
store the first telemetry data to one or more databases;
analyze telemetry data, including the first telemetry data, stored in the one or more databases to determine one or more usage patterns associated with the first usage;
monitor streaming content accessed by a particular user, wherein the instructions to monitor the streaming content comprises instructions to analyze the content to determine a content type and one or more content patterns, wherein the content includes a concurrent presentation of at least a first media and a second media on the first user device;
determine whether a media streaming quality of the streaming content is likely to be compromised by executing a content recognition algorithm;
in response to determining that the media streaming quality is likely to be compromised by the content recognition algorithm, determining via, at least a color histogram analysis, the one or more content patterns associated with the streaming content;
determine that a presentation of the first media violates one or more rules, based at least in part on the one or more content patterns;
generate a content block trigger to block a presentation of the first media and simultaneously permit access to the second media on the first user device; and
send the content blocking trigger to a plurality of user devices associated with the first user device.

19. The one or more non-transitory computer-readable media of claim 18, wherein the instructions further direct the application server to:
send the content blocking trigger to a second user device associated with the particular user to trigger the second user device to block the content, wherein the first user device corresponds to a first device type and the second user device corresponds to a second device type, the first device type and the second device type being selected from a group consisting of a mobile phone, a personal computer, a television receiver, a voice-activated virtual assistant device, a gaming console, and a network device, and wherein the second device type is a different device type relative to the first device type.

20. The one or more non-transitory computer-readable media of claim 18, wherein the content type is one of a plurality of content types that identifies a corresponding appropriate age range for the content.

* * * * *